June 14, 1960 C. E. MONSEES ET AL 2,940,408
TUBE FORMER AND METHOD OF MAKING SAME
Filed Jan. 21, 1959

INVENTORS
Claude E. Monsees
Francis H. Cooper
BY
Bacon & Thomas
ATTORNEYS

United States Patent Office 2,940,408
Patented June 14, 1960

2,940,408
TUBE FORMER AND METHOD OF MAKING SAME

Claude E. Monsees and Francis H. Cooper, Durham, N.C., assignors to Sperry Rand Corporation, Wilmington, Del., a corporation of Delaware Filed Jan. 21, 1959, Ser. No. 788,185

7 Claims. (Cl. 113—116)

This invention relates to tube formers, and particularly to tube formers adapted to guide and direct a continuous web of bag-forming material to and through the interior of a cylindrical former to thereby form the flat web into a cylindrical tube with overlapping edges and without employing an internal mandrel.

In brief, the invention comprises a novel tube former of the type wherein a hollow cylindrical member is provided with an upper edge curving generally obliquely across the cylinder and a generally conical collar or guide portion joined to the cylinder at the upper edge thereof. A free edge of the collar portion defines a straight line transverse to the web to be guided thereby and the collar is curved into generally conical shape and intersects the cylindrical portion at its upper edge to thereby guide a flat web into cylindrical configuration against the interior surface of the cylindrical portion wherefrom it may be drawn downwardly through the former and will emerge as a cylinder which may be sealed and cut into bags as desired. The particular novelty resides in such a tube former wherein the collar portion and the cylindrical portion are formed of an integral and continuous sheet of material, preferably metal, whereby the web-guiding surfaces of the two portions are integral and continuous.

The tube former of the present invention is formed from a flat sheet of metal by providing a groove in one surface thereof, the groove being curved according to an equation, to be described, whereupon the sheet may thereafter be folded along the groove into the finished form described above. The invention herein comprises the tube former of novel construction, a method of forming the same, and a novel blank from which the tube former may be constructed.

It is therefore an object of this invention to provide a novel form of tube former having means to guide a continuous web of flexible material to the interior of a hollow cylindrical former to form the web into a cylinder without the use of an interior mandrel and wherein the guide surfaces are so formed and constructed that no unequal or excessive strains are placed on any portions of the bag-forming material.

Another object of this invention is to provide a tube former of the type set forth wherein the guiding surfaces of a collar portion and a cylindrical portion are continuous and integral and wherein the distance along said surfaces, measured in the direction of movement of a web guided thereby, are all exactly equal.

Still another object of this invention is to provide a novel tube former structure by which the previous objects are attained.

A further object is to provide a novel method of making a tube former from a single integral sheet of material.

A still further object of this invention is to provide a novel structure and method for a tube former whereby a former of any desired size may be produced.

An additional object of the invention is to provide a novel sheet metal blank for the formation of a tube former as described.

Other objects and advantages will become apparent to those skilled in the art as this description proceeds with reference to the accompanying drawings, wherein.

Figure 1:
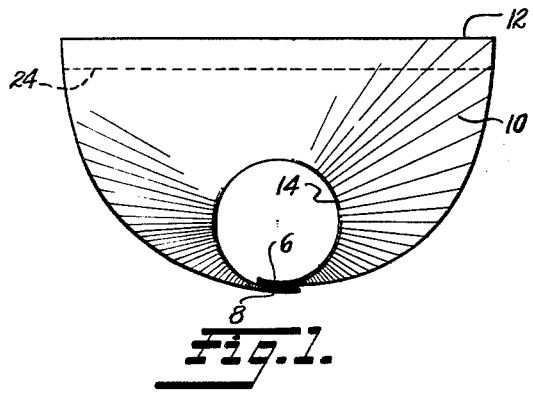
Fig. 1 is a top plan view of a novel tube former embodying the present invention.
Figure 3:
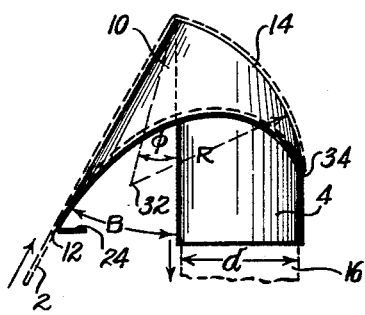
Fig. 3 is a side elevational view of the tube former of Fig. 1.
Figure 2:
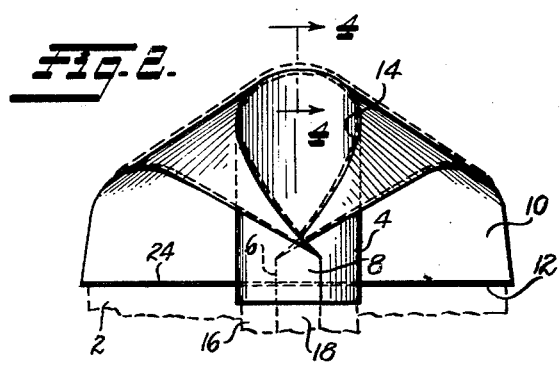
Fig. 2 is a front elevational view of the tube former of Fig. 1.

The tube former shown in Figs. 1, 2 and 3 is designed to guide a web 2 (see dotted lines of Figs. 2 and 3) of flexible bag-forming sheet material into a cylindrical shape with overlapping longitudinal edges and without the employment of an internal mandrel or the like. The tube former comprises a hollow cylindrical portion 4 having overlapping but slightly radially spaced edge portions 6 and 8 and a guiding or collar portion 10. The portion 10 is referred to hereinafter as a collar portion for convenience, in view of its resemblance to the collar of certain garments. The collar portion 10 is straight in a transverse direction along its edge 12 and is progressively curved into a generally conical shape, as shown, to where it intersects the upper edge 14 of the cylindrical portion 4. The collar portion 10 is not of true conical configuration since the degree and direction of curvature varies progressively to form a compound curve. However, for purposes of convenience, the shape of the collar portion will hereinafter be referred to as "generally conical." The uppermost surface of the collar portion 10 constitutes a guide surface along which a face of the web 2 slides and is guided toward the edge 14. At the edge 14 the web 2 folds inwardly and downwardly and follows the inner surface of the cylindrical portion 4 to emerge therebelow, at 16, in the form of a tube or cylinder having overlapping longitudinal edges 18. The downwardly extending tubular portion 16 of the web 2 may be drawn downwardly through the cylindrical portion 4 in a continuous or in a step-by-step manner and the collar portion 10 guides the web 2 unerringly and smoothly to and over the edge 14.

For a device of the type described above to operate satisfactorily and successfully, it is essential that the distance along the guiding surfaces of the collar 10 and cylinder 4, measured in the direction of movement thereover of all portions of the web 2, be exactly equal from the edge 12 to the lowermost terminus of the edge 14. Thus, all transverse portions of the web 2 must be drawn at the same speed, with the same tension, and must at all times be in sliding contact with the guiding surfaces of the collar 10 and cylindrical portion 4. If there were a projection on the edge 14 or inequality in the lengths of the paths described, the web 2 would buckle or fold and would become torn and the apparatus would not function satisfactorily.

To insure equality of all of the paths of movement of portions of the web 2, as described above, the cylindrical portion 4 and the collar portion 10 are formed from a single integral sheet of material, preferably metal, and the guiding surfaces thereof are defined by the original integral and uninterrupted surface of the sheet from which the tube former is constructed.

Figure 4:
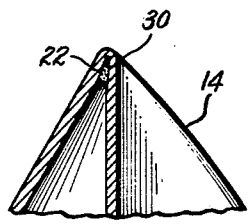
Fig. 4 is an enlarged fragmentary sectional view taken substantially along the line 4—4 of Fig. 2.
Figure 5:
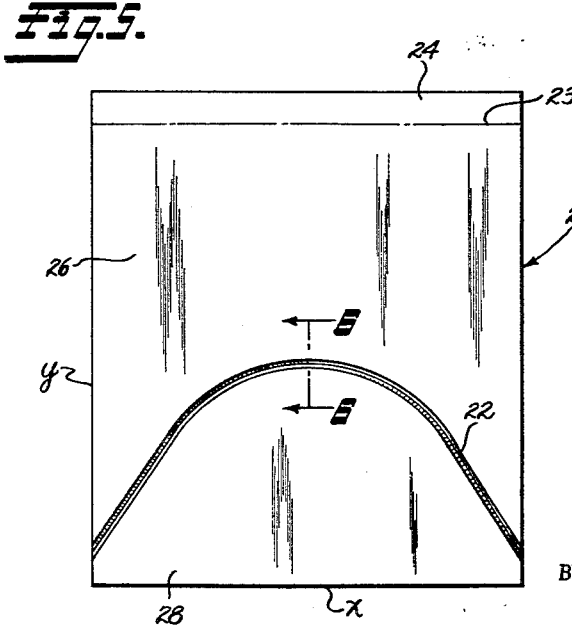
Fig. 5 is a plan view of a blank from which the tube former of Figs. 1 to 3 is fabricated.
Figure 6:
Fig. 6 is an enlarged fragmentary sectional view taken substantially along the line 6—6 of Fig. 5.

Fig. 5 shows a flat rectangular blank 20 of sheet metal having a curved groove 22 extending thereacross and terminating at the edges of the blank 20 closely adjacent one end thereof. Obviously, however, the lower edge of the blank 20 could be lower than shown, resulting only in a longer cylindrical portion 4. The broken line 23 indicates a line along which the blank 20 is folded to provide the flange 24 which in turn terminates in and defines the edge 12 previously referred to in describing the finished tube former. As is apparent, the curved groove 22 is bowed upwardly as seen in Fig. 5 and divides the blank 20 into two portions. The portion 26, on the convex side of groove 22, is the material from which the collar 10 is formed, whereas the portion 28, on the concave side of the groove 22, is the portion from which the cylindrical portion 4 is formed. The groove 22 is of generally V-shape in cross-section (see Fig. 6) and is formed to extend from one-half to two-thirds of the way through the thickness of the sheet of material constituting the blank 20. The groove 22 is formed as a rather wide-angled V-groove, preferably of the order of about 150° included angle. The blank 20 of Fig. 5 is folded along the apex of the groove 22 in such a manner that the groove is on the inside of the fold and while the blank is being thus folded the portion 28 is rolled or otherwise controlled to produce the cylindrical portion 4. Upon enforcing the portion 28 into the shape of a cylinder, the portion 26 will naturally and forcibly assume the configuration of the guiding collar 10 as described and shown in connection with Figs. 1 to 3. Before the blank of Fig. 5 is folded and formed as described, the flange 24 is preferably formed by bending along the dotted line 23. After folding the blank 20 to the desired shape, the groove 22 is filled with a reinforcing material, bonded to the material of the blank whereby to define a rigid and firm tube former. Fig. 4 shows, at 30, the reinforcing material. The blank 20 may be and preferably is formed of stainless steel and the filler material 30 is metal deposited in the groove 22 which may be done by flowing molten silver solder or the like into the groove whereby it is securely bonded to the metal of the tube former. However, this tube former may be constructed of other metals or even non-metallic materials, if desired.

By reference to Fig. 4 it will be seen that the edge 14, which defines the intersection of the surfaces of collar 10 and cylindrical portion 4, is a continuous, smooth and integral surface of the original blank and the areas of the guiding surfaces are exactly the same as the areas of the portions 26 and 28 and their total is exactly that of the blank 20. Therefore, the conditions requisite for the equality of lengths of the paths previously referred to are present and the edge 14 is a smooth uninterrupted edge defined by a continuous integral surface.

By reference now to Fig. 3, the internal diameter of the cylindrical portion 4 is identified as $d$ and the laterally horizontal projection of the edge 14 is a circular arc of radius R having its center at 32 (an imaginary point). The edge 14 thus defines the intersection of vertical cylinder 4 and an imaginary horizontal cylinder transverse to the cylinder 4 having its axis at 32 and being tangent to the cylinder 4 at 34. The horizontal imaginary cylinder is tangent to the cylinder 4 only at point 34 and extends transversely across the diametrically opposite edge of the cylinder 4. The angle B is shown as the angle between the collar portion 10 and the cylinder 4 at the uppermost extremity of the edge 14 and is the angle at which the web of material 2 approaches the axis of the cylindrical portion of the tube former.

The portion 28 of the blank 20 is a flat development of the cylindrical portion 4 and the apex of groove 22 is a flat development of the edge 14. The equation governing the curvature of the groove 22 is:

$$y = \sqrt{\left[\frac{d}{1-\sin(.6522B-5.22)}\right]^2 - \left[\frac{d}{2}\left(1-\cos\frac{2x}{d}\right) - \frac{d}{1-\sin(.6522B-5.22)}\right]^2}$$

In the above equation the quantity $d$ is the desired internal diameter of the cylindrical portion 4 and the angle B is the desired approach angle for the web, described above in connection with Fig. 3. The variables $x$ and $y$ are the conventional coordinate variables measured along the edges of the blank 20 as indicated in Fig. 5. It is to be noted that the angle B is the angle between the collar portion 10 and the cylindrical portion 4 in the axial plane of portion 4 containing that point of edge 14 wherein $y$ has its greatest value. The values ".6522" and "5.22" are empirical constants expressing the relationship between angle B and the angle $\phi$ (Fig. 3). The sine of $\phi$ appears in the above equation but $\phi$ is expressed in terms of B and the empirical constants. It will be evident that, with the above equation, a tube former may be designed and constructed to any desired size and wherein the web approaches the tube former at substantially any desired angle. The groove 22, formed in the blank 20, may be described as being bowed upwardly but may also be described as curving continuously in the same direction since there are no reverse-curved portions.

The provision of the groove 22 renders it relatively easy to fold the blank 20 in the manner described along an accurately controlled line whereby the desired finished tube former may be produced with certainty and to a high degree of accuracy.

While a single specific embodiment of the invention is shown and described herein, it is to be understood that other modifications and departures from the specific disclosure may be resorted to within the scope of the appended claims.

We claim:

1. The method of forming a tube former from a single sheet of metal comprising, the steps of; forming a groove completely across one face of said sheet, said groove curving continuously in the same direction, folding said sheet along said groove as a fold line with said groove on the inside of said fold line, and simultaneously forming the portion of said sheet on the concave side of said groove to define a cylinder.

2. The method of claim 1 wherein said groove is of substantially V-shape in section and extends from one-half to two-thirds of the way through said sheet.

3. The method of claim 1 wherein said groove is formed as a V-shaped groove having an included angle of approximately 150°.

4. The method of claim 1 wherein said groove is formed to follow the curve defined by the equation:

$$y = \sqrt{\left[\frac{d}{1-\sin(.6522B-5.22)}\right]^2 - \left[\frac{d}{2}\left(1-\cos\frac{2x}{d}\right) - \frac{d}{1-\sin(.6522B-5.22)}\right]^2}$$

wherein $y$ is the distance of said curve from a reference axis, $x$ is the distance along said axis, $d$ is the desired inside diameter of said cylinder, and B is the desired angle between said folded portions at the point where the value of $y$ is greatest.

5. The method of claim 1 including the further step of filling said groove, on the inside of the fold, with metal and fusing said metal to said sheet.

6. A blank for a tube former comprising, a rectangular sheet of metal, a groove extending transversely across one face of said sheet but bowed toward one end of said sheet, said groove being of V-shape in section and extending from one-half to two-thirds of the way through said sheet.

7. A blank as defined in claim 6 wherein said groove is bowed to follow the curve:

$$y=\sqrt{\left[\frac{d}{1-\sin{(.6522B-5.22)}}\right]^2-\left[\frac{d}{2}\left(1-\cos\frac{2x}{d}\right)-\frac{d}{1-\sin{(.6522B-5.22)}}\right]^2}$$

wherein $x$ and $y$ are coordinate dimensions extending, respectively, across and lengthwise of said sheet, $d$ is the desired inside diameter of a cylindrical portion to be formed, and B is the desired angle of approach of a tube-forming web to the axis of said cylindrical portion.

References Cited in the file of this patent

UNITED STATES PATENTS

| | | |
|---|---|---|
| 2,285,263 | Fitch | June 2, 1942 |
| 2,431,411 | McKee | Nov. 25, 1947 |
| 2,602,988 | Klym | July 15, 1952 |
| 2,621,622 | Henchert | Dec. 16, 1952 |
| 2,832,271 | Jarund | Apr. 29, 1958 |
| 2,869,499 | Arnit | Jan. 20, 1959 |
| 2,899,875 | Leasure | Aug. 18, 1959 |